US 6,674,752 B1

(12) United States Patent
Colizzi et al.

(10) Patent No.: US 6,674,752 B1
(45) Date of Patent: Jan. 6, 2004

(54) SWITCH MATRIX AMONG TRIBUTARIES OF A TELECOMMUNICATION NETWORK AND MANAGING METHOD THEREOF

(75) Inventors: Ernesto Colizzi, Monza (IT); Marco Lovadina, Milan (IT)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/333,293

(22) Filed: Jun. 15, 1999

(30) Foreign Application Priority Data

Jun. 19, 1998 (IT) .......................................... TO98A0529

(51) Int. Cl.$^7$ ............................................. H04Q 11/00
(52) U.S. Cl. ................................ 370/372; 365/189.12
(58) Field of Search ................................ 370/366, 367, 370/369, 372, 373, 374, 386, 387, 388, 371, 378, 395.7, 395.71, 395.72; 365/189.01, 189.02, 189.04, 189.05, 189.12

(56) References Cited

U.S. PATENT DOCUMENTS

| | | | | |
|---|---|---|---|---|
| 4,320,501 A | * | 3/1982 | Le Dieu et al. | 370/368 |
| 5,168,492 A | * | 12/1992 | Beshai et al. | 370/353 |
| 5,381,409 A | * | 1/1995 | Folkert de Vries | 370/392 |
| 5,796,733 A | * | 8/1998 | Norris | 370/366 |
| 5,815,489 A | * | 9/1998 | Takatori et al. | 370/217 |
| 5,914,952 A | * | 6/1999 | Eom et al. | 370/369 |
| 6,064,670 A | * | 5/2000 | Athenes et al. | 370/375 |
| 6,125,111 A | * | 9/2000 | Snow et al. | 370/360 |
| 6,246,668 B1 | * | 6/2001 | Kusyk | 370/228 |

FOREIGN PATENT DOCUMENTS

WO    WO 95/32599    * 11/1995

OTHER PUBLICATIONS

Obara, H.; Efficient parallel time–slot interchanger for high-–performance SDH/SONET digital crossconnect systems; Electronics Letters, vol.: 37 Issue: 2, Jan. 2001, Page(s): 81–83.*

(List continued on next page.)

*Primary Examiner*—Chau Nguyen
*Assistant Examiner*—Jasper Kwoh
(74) *Attorney, Agent, or Firm*—Sughrue Mion, PLLC

(57) ABSTRACT

A switch matrix among tributaries of a telecommunication network operating on flows of data which are arranged according to SDH protocol, said switch matrix comprising a set of parallel branches, each of said branches comprising at least a space stage able to select and pack from the input data flow a subset of data to be exchanged, a second time stage able to store the data subset to be exchanged and comprising a random access memory device associated with a write memory and a read memory, said write memory and read memory being driven by a microprocessor and a master counter. The invention is characterized in that the read memory and write memory of each random access memory device are updated in association with a spare read memory which is common to read memories on all branches in parallel and with a spare write memory which is common to write memories on all branches in parallel, respectively.

18 Claims, 7 Drawing Sheets

OTHER PUBLICATIONS

S. Kikuchi et al, "An Expandable Time–Division Circuit Switching LSI and Network Architecture for Broadband ISDN", IEEE Journal on Selected Areas in Communications, IEEE Inc., NY, US, vol. 14, No. 2, Feb. 1, 1996, pp. 328–336, XP000581573.

M. K. R. Walker, "Optimum Structures of Space Switching Fabrics for SDH Cross–Connect Equipment", Proceedings of the Conference on Telecommunications, Manchester Apr. 18–21, 1993, London, IEE, GB, pp. 121–126;, XP000473712.

Y. Nakano et al, "Signal Processing for SDH Digital Cross––Connect System", Proceedings of the International Conference on Communications (ICC), Geneva, May 23–236, 1993, NY, IEE, vol. 3, pp. 900–904 XP010136993.

Y. Aoki et al, "Development of Low–Power LSI Chip Sets for SDH Transmission Equipment", NEC Research and Development, Nippon Electric Ltd. Japan, vol. 36, No. 1 1995, pp. 11–20, XP000532531.

Y–S Yeh et al, The Knockout Switch: A Simple, Modular Architecture for High–Performance Packet Switching, IEEE Journal on Selected Areas in Communications, IEEE, Inc. NY, US, vol. SAC–5, No. 8, Oct. 1, 1987, pp. 1274–1283, XP002043806.

\* cited by examiner

SWITCH MATRIX AMONG TRIBUTARIES OF A TELECOMMUNICATION NETWORK AND MANAGING METHOD THEREOF

TECHNICAL FIELD

The present invention relates to a switch matrix among tributaries of a telecommunication network, specifically a telecommunication network operating on flows of data which are structured according to SDH protocol, said switch matrix comprising a set of parallel branches, with each branch comprising at least a first space stage able to select and pack from the input data flow a subset of data to be exchanged, a second time stage able to store the data subset to be exchanged and comprising a random access memory device, associated with a write memory and a read memory, said write memory and read memory being driven by a microprocessor and a master counter. Hereafter, the term "telecommunication networks" will mean synchronous signal carrying networks, specifically according to SDH (Synchronous Digital Hierarchy) standard.

BACKGROUND ART

Telecommunication networks are equipped with elements located in the switching stations, called "switch matrixes", which can carry out connections between communication circuits, the so-called 'tributaries', with the aim of putting users in communication. Switch matrixes operate according to users' requests or under direct control of the network manager, establishing the so-called semi-permanent connections.

As known, SDH frames, e.g. frames STM-1 generally consist of a subframe set called Virtual Containers, which in turn consist of lower order Virtual Containers according to a hierarchic structure. Therefore, an SDH frame will appear like a subframe time sequence and a switch matrix fulfills its function of connection maker by reassigning the location of Virtual Containers within the SDH frame.

The most common manner for obtaining a switch matrix consists in employing a random access memory element, i.e. a RAM memory, equipped with two access ports or gates, i.e. at least a write port and a read port. RAM memories are known, for instance, having 16 write ports and 8 read ports. Such a RAM memory is able to exchange all Virtual Containers contained in the input frames and generate 8 output frames. Moreover, it is a strictly nonblocking structure, i.e. always able to establish connections without altering other connections already established. On the other hand, a RAM memory requires that during write operations a proper counter will sequentially supply the addresses where to write input data in the memory element. A read control memory containing read addresses, i.e. the data read order is also needed to rearrange output frames to obtain desired connections.

However, even if the use of a RAM memory according to the above mode is advantageous for its simple implementation, considerable drawbacks exist since RAM memories of the type described above are not conventional memories, i.e. they need a design strictly associated with the type of switch matrix to be obtained.

The use of a switch matrix of a so-called "knock-out switch" type is known. This is a multistage connection type, where the main modular element consists of a space-time-space matrix. The "knock-out switch" allows for employing a memory so sized as to store the data exclusively related to reassignment.

The purpose of the first space stage is to adapt the input data flow to obtain a sequential filling of a elastic memory, which represents the subsequent time stage.

The second stage, i.e. the so-called subsequent time stage, operates the exchange of the time position of the tributaries which have been sequentially randomly introduced in the output frame. It consists of a sequential write/programmable read-memory.

The third stage, if required, detects the data to be routed to several outputs when the second stage has an output capacity greater than a frame.

FIG. 1 shows a block diagram of a "knock-out switch" KS according to the known state of the art.

As it can be noted an input data flow DIN containing an integer number N of frames ST is available. Each frame ST is divided internally in time units TS, identifying the various bytes to be switched. In the following description the number N will be equal to 8, unless otherwise indicated. Input data flow DIN is sent to a number m of branches $BR_1...BR_m$ in parallel. The same structure is duplicated on each of said branches $BR_1...BP_m$, said structure comprising a concentrator rotator block CR controlled by a write control memory WCM through a write sequence WW. Said write sequence WW contains information where active bytes are located, i.e. the pertaining bytes DSC for the exchange. A buffer BUF, namely a temporary transit memory is provided downstream the concentrator rotator block CR. Then a memory DTRAM driven by a read control memory RCM will follow through a read word RR, which contains the addresses to be read in the memory DTRAM. Said memory DTRAM which is an elastic multiport RAM memory is provided with a plurality of outputs OUT. Said outputs OUT are N/m for each memory DTRAM, so that the memory $DTRAM_1$ will have $OUT_0$ to $OUT_{N/m-1}$ outputs and memory $DTRAM_m$ $OUT_{N(m-1)/m}$ to $OUT_{N-1}$ outputs. Thus, in the knock-out switch KS what represented a single memory matrix is divided in m branches $BR_1...BR_m$. Each of said branches BR1...BRm only elaborates sets of time units or subframes ST relating to a group of N/m outputs OUT. This will obviously allow the use of smaller memories DTRAM as a function of the number m of branches $BR_1...BR_m$ being chosen.

The concentrator rotator block CR is substantially a combinatorial network with N inputs and outputs. The concentrator rotator block CR has to select the bytes DSC relating to its branch BR in the data flow DIN, place them in adjacent positions and then rotate the thus obtained set of bytes to completely fill the memory DTRAM. FIG. 2 shows operation of a concentrator rotator block CR with N=5, in six subsequent time units TS. Pertaining bytes DSC spread at the input of the concentrator rotator block CR are concentrated and properly placed inside the memory DTRAM through a circular shift operation, i.e. a rotation. Naturally, during these operations the concentrator rotator block CR is driven by the write sequence WW.

The subsequent buffer BUF is required should the memory DTRAM only allow to write words of a predetermined length. Since the number of output bytes from the concentrator rotator block CR is variable in time, the bytes are temporary stored in the buffer BUF till a full word is formed. As soon as this happens, the word obtained is transferred to the memory DTRAM.

The concentrator rotator block CR is driven by the write control memory WCM, which is a memory whose depth is equal to the number of time units TS forming the frame ST and a word length equal to the one of the write sequence WW of N bits. Being said j and k generally two integer indexes, the j-th bit of the k-th write sequence WW in the write control memory WCM is set at 1 if the byte in the k-th time unit TS of the j-th input frame ST has to be saved in the memory DTRAM belonging to the same branch of the write control memory WCM under consideration.

When the memory DTRAM is completely filled, it is read with random access, according to the contents of the read control memory RCM.

Also the "knock-out switch" has some drawbacks, even if it allows subdivision of the memory in a plurality of smaller memories.

When using a RAM standard memory, each byte corresponding to a Virtual Container is always stored in the same memory location. This does not occur for the knock-out switch, due to concentration and rotation operations. Therefore, if a connection should be changed, the content of the whole read control memory has to be refreshed, whereas for the write control memory only bit related to the modified connection needs to be changed. Therefore an external microprocessor to refresh control memories is used. The refreshing step of control memories is quite crucial, since during the change of the write control memory content, it may happen that in the memory the position of some bytes not involved by the new connection will change. Substantially, this happens because there are some time intervals during which a portion of the memory has to be written under the control of the refreshed control memory, whereas the remaining part is still written under the control of the "old" control memory. This is clearly reflected on the read control memory, which has to partially drive the reading operation as a refreshed memory, partially as an "old" memory.

A simple solution is to duplicate control memories both in read and write modes. FIG. 3 shows the structure of a knock-out switch memory branch with memory duplication KS2. The input has the data flow DIN, consisting of N frames ST. Reference is made in the following to a frame ST consisting of Virtual Containers VC12, wherein 18 "overhead" bytes and 63 data bytes or "payload" bytes, repeated four times are provided. It should be appreciated that write control memories $WCM_a$ and $WCM_b$ are provided, one as the reproduction or duplicate of the other, which drive the concentrator rotator block CR through a multiplexer WMUX. A memory DRM, driven by respective read control memories $RCM_a$ and $RCM_b$, through a read multiplexer RMUX, is structured as three parallel blocks: an overhead memory block OHMEM, a first memory block DMEM1 and a second memory block DMEM2. The overhead memory block OHMEM is simply used to store the 18 "overhead" bytes of the frame ST. The first memory block DMEM1 and the second memory block DMEM2 contain 63×N/m bytes, respectively. Therefore, memory DRM outputs data flows OHOUT, 1OUT, 2OUT, consisting of N/m frames, which are conveniently selected by an output multiplexer OMUX to form the output data flow OUT. Output frames result delayed by 63 time units TS compared to input frames.

Operations being executed upon arrival of a frame ST at an input IN of the memory DRM are the following:

a) writing the overhead memory OHMEM;

b) starting the writing of first memory block DMEM1;

c) completing the writing of the first memory block DMEM1 and, at the same time, reading the overhead memory OHMEM;

d) writing the second memory block DMEM2 and reading the first memory block DMEM1;

e) writing the first memory block DMEM1 and reading the second memory block DMEM2;

f) writing the second memory block DMEM2 and reading the first memory block DMEM1;

g) writing the overhead memory block OHMEM, subsequently starting writing the first memory block DMEM1 and reading the second memory block DMEM2;

h) completing the writing of the first memory block DMEM1 and reading the overhead memory block OHMEM.

FIG. 3b shows a time diagram of the memory DRM output and input, reporting the above disclosed operation steps.

Said operations are repeated for each subsequent frame ST, so that each portion of the memory DRM is written under control of either updated or old control memories.

When a connection change occurs, control memories need to be refreshed. To maintain synchronism, read control memories $RCM_a$ and $RCM_b$ have to be refreshed introducing a delay equal to the number of time units TS contained in the frames payload ST, i.e. 63, compared to read control memories $WCM_a$ and $WCM_b$. The refreshing step occurs through read control memories $RCM_b$ and write control memories $WCM_b$, either duplicate or spare. It is possible, in fact, to refresh the content of duplicate read control memories $RCM_b$ and write control memories $WCM_b$, whereas operations on the memory DRM are controlled by read control memories $RCM_a$ and write control memories $WCM_a$. Once the refreshing step is over, the write multiplexer WMUX and read multiplexer RMUX will switch and control will be passed to duplicated read control memories $RCM_b$ and write control memories $WCM_b$.

This solution can avoid any problems due to unrefreshed control memories based readings. However, it will obviously lead to the use of a large amount of memory, with a consequent increase of space requirements in the circuits and higher circuit costs.

It is the object of the present invention to solve the above drawbacks and provide a switch matrix among the tributaries of a telecommunication network, having a more effective and improved performance.

In this connection, it is the main object of the present invention to provide a switch matrix among the tributaries of a telecommunication network, which requires a smaller number of circuits, resulting in a lower space requirement for the circuits and lower manufacturing costs.

A further object of the present invention is to provide a switch matrix among the tributaries of a telecommunication network, which has read and write control memories of the main memory which can be updated without the need of duplicating said main memory and without incurring read errors of said main memory.

A further object of the present invention is to provide a switch matrix among the tributaries of a telecommunication network, which employs a packing circuit for the bytes to be elaborated, whose structure is more compact and efficient compared to other known solutions.

A further object of the present invention is to provide a switch matrix among the tributaries of a telecommunication network, which distributes incoming data flows in order to reduce the complexity of the memory managing logic circuits.

DISCLOSURE OF THE INVENTION

In order to achieve such objects, the present invention provides a switch matrix among the tributaries of a telecommunication network incorporating the features of the annexed claims, which form an integral part of the present description.

According to one aspect of the present invention there is provided a switch matrix among the tributaries of a telecommunication network, specifically a telecommunication network operating on flows of data arranged according to SDH protocol, said switch matrix comprising a set of parallel branches, each of said branches comprising at least a first space stage which is able to select and pack, from the input data flow, a subset of data to be exchanged, a second time stage which is able to store the data subset to be exchanged and comprising a random access memory device associated with a write memory and a read memory, said write memory and read memory being driven by a microprocessor and a master counter, wherein the read memory and write memory related to each random access memory device are updated together with a spare read memory which is common to read memories on all branches in parallel and with a spare write memory which is common to write memories on all branches in parallel, respectively.

BRIEF DESCRIPTION OF THE DRAWINGS

Further objects, features and advantages of the present invention will become apparent from the following detailed description and annexed drawings, which are supplied by way of non limiting example, wherein.

BEST MODE FOR CARRYING OUT THE INVENTION

Figure 4:
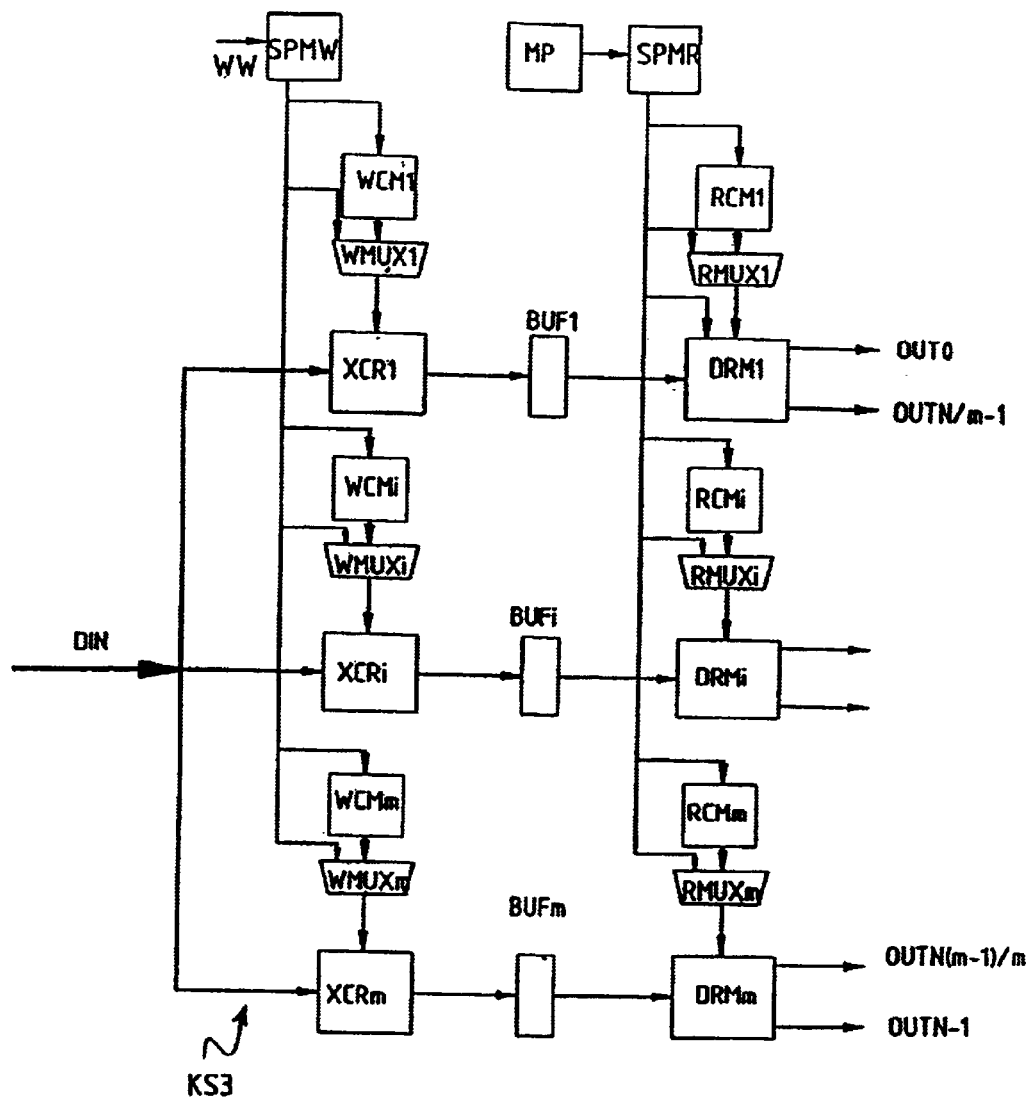
FIG. 4 shows a first detail of a switch matrix among the tributaries of a telecommunication network according to the present invention.

FIG. 4 shows the diagram of a switch matrix KS3 according to the present invention. Said switch matrix KS3 is also a "knock-out switch"-type switch matrix, as it consists of m branches $BR_1...BR_m$. For simplicity sake the first branch $BR_1$, the i-th general branch BRi and the m-th and the last branch $BR_m$ are shown in the figure. The i-th general branch $BR_i$ comprises a packer block $XCR_i$, a buffer $BUF_i$ and a memory $DRM_i$. The packer block $XCR_i$ is driven by a corresponding write control memory $WCM_i$ through a write multiplexer $WMUX_i$. Memory $DRM_i$ is read driven by a corresponding read control memory $RCM_i$ through a read multiplexer $RMUX_i$. Moreover, a spare write control memory SPMW and a spare read control memory SPMR controlled by a microprocessor MP are also provided. The outputs of the spare write control memory SPMW and spare read control memory SPMR are connected to both their corresponding write control memories $WCM_1...WCM_m$ and read control memories $RCM_1...RCM_m$, and to corresponding write multiplexers $WMUX_1...WMUX_m$ and read multiplexers $RMUX_1...RMUX_m$.

Operation of the spare read control memory SPMR will be now described, bearing in mind that execution of write operations is exactly the same.

The spare read control memory SPMR is a memory whose size is equal to that of the other read control memories $RCM_1...RCM_m$.

During the normal operation mode, that is when no connections have to be changed, all the read multiplexers $RMUX_1...RMUX_m$ select the output of their respective read control memories $RCM_1...RCM_m$. Moreover, all read control memories $RCM_1...RCM_m$ have reading access.

If the read control memory $RCM_i$ needs to be updated, the microprocessor MP writes first of all in the spare read control memory SPMR the words that will be stored in the read control memory $RCM_i$. After the spare read control memory SPMR is filled with the future content of the read control memory $RCM_i$, the read multiplexer $RMUX_i$ selects the spare read control memory SPMR output, which is also sent to the input of the read control memory $RCM_i$. Said read control memory $RCM_i$ will then change its operating mode and make writing possible, so it can be updated by the content of the spare read control memory SPMR.

When the microprocessor MP writes in the spare read control memory SPMR, scan of its memory addresses is driven by the microprocessor MP itself. Subsequently, scan of its memory addresses is driven by the memory counter $DRM_i$, not shown for simplicity sake, which also controls read control memories $RCM_i$. After a complete scan of the spare read control memory SPMR, the read control memory $RCM_i$ has become fully updated, then the read multiplexer $RMUX_i$ selects the output of the read control memory $RCM_i$, which at the same time changes its operating mode to read mode. Then the spare read control memory SPMR can be used to update another read control memory $RCM_i$.

Thus, only m+1 memories like the read control memory $RCM_i$ and m+1 memories like the write control memory $WCM_i$ can be advantageously used for the management of updating operations.

Figure 4B:
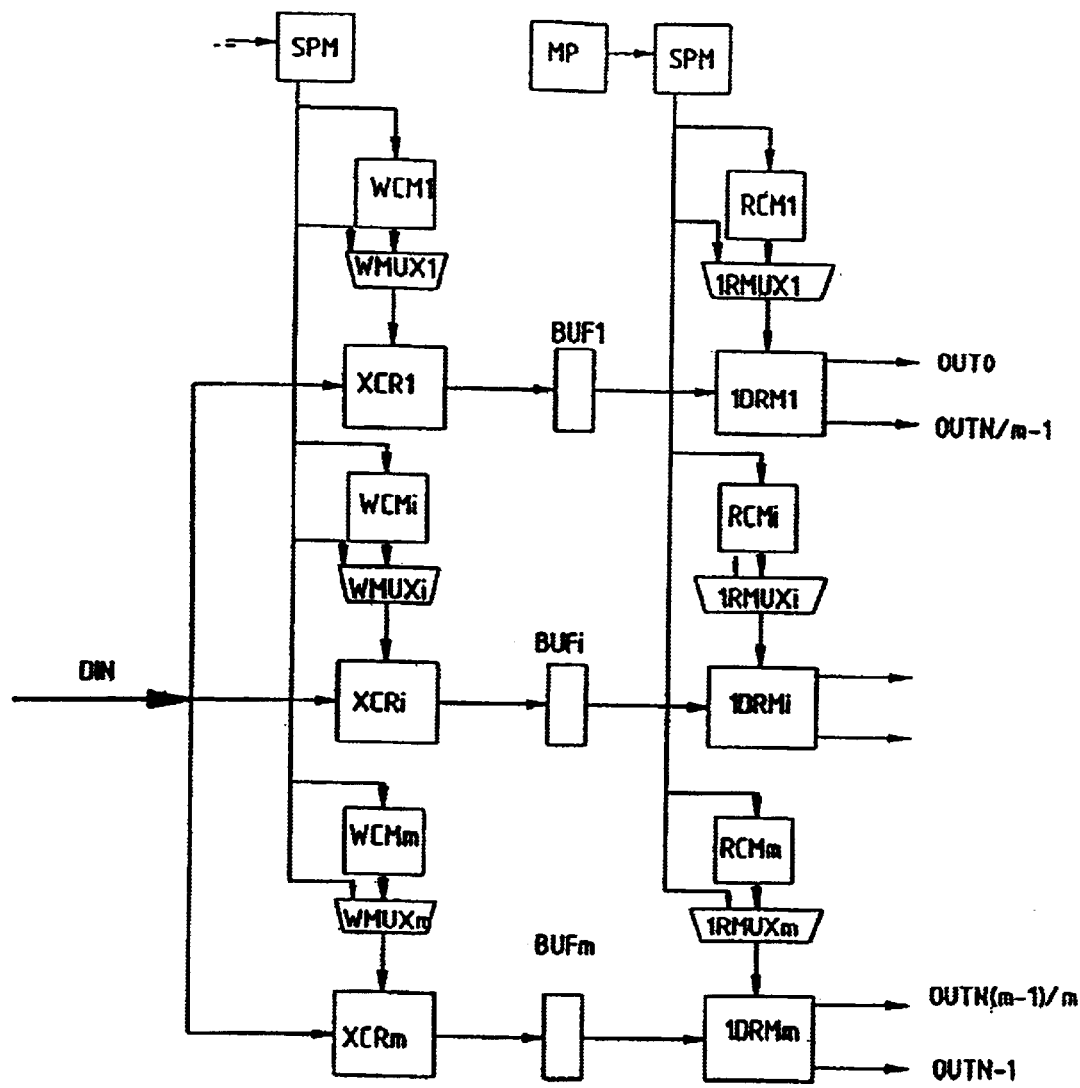
FIG. 4b shows an other embodiment of the detail of FIG. 4.

FIG. 4b shows a possible variation of the updating mode of read and write control memories. In fact, a different procedure can be used for updating the read control memory RCM, which does not require the use of the RAM memory block DRM duplicated in two subblocks being written and read alternatively, but only a single memory block 1DRM, which may also contain the overhead memory OH separately. In this case the corresponding multiplexer 1RMUX is able to dynamically choose between the spare control memory SPMR and read control memory RCM, as to whether the byte to be read has been written or not under control of an updated write control memory WCM. The multiplexer 1RMUX carries out the selection based on a rather simple principle. In fact, if the content of the new read control memory RCM, i.e. the address to be read in the memory block 1DRM, is greater than the address whereto it is written in the read control memory RCM itself, the byte to be read will be written under control of the old write control memory WCM. If, on the contrary, the contents of the new read control memory RCM is smaller than the address whereto it is written in the control memory RCM itself, the byte to be read will be written under control of the new write control memory WCM.

At the same time the read control memory RCM is updated. Once the read control memory RCM is fully updated, the read multiplexer 1RMUX selects the output of the read control memory RCM definitively and the spare control memory SPMR can be used to update the control memory of another branch. Thus, even if the management of multiplexers is more complex, a substantial halving of the RAM memory size to be used is obtained. Moreover, output frames are no longer affected by the time delay due to the storage of an entire subframe in one of the two submemories DMEM1 and DMEM2 of the memory DRM. In such an instance read control memories RCM must be dual-port memories, since the multiplexer 1MUX selects the output of the read control memory RCM while it is written.

Figure 5:
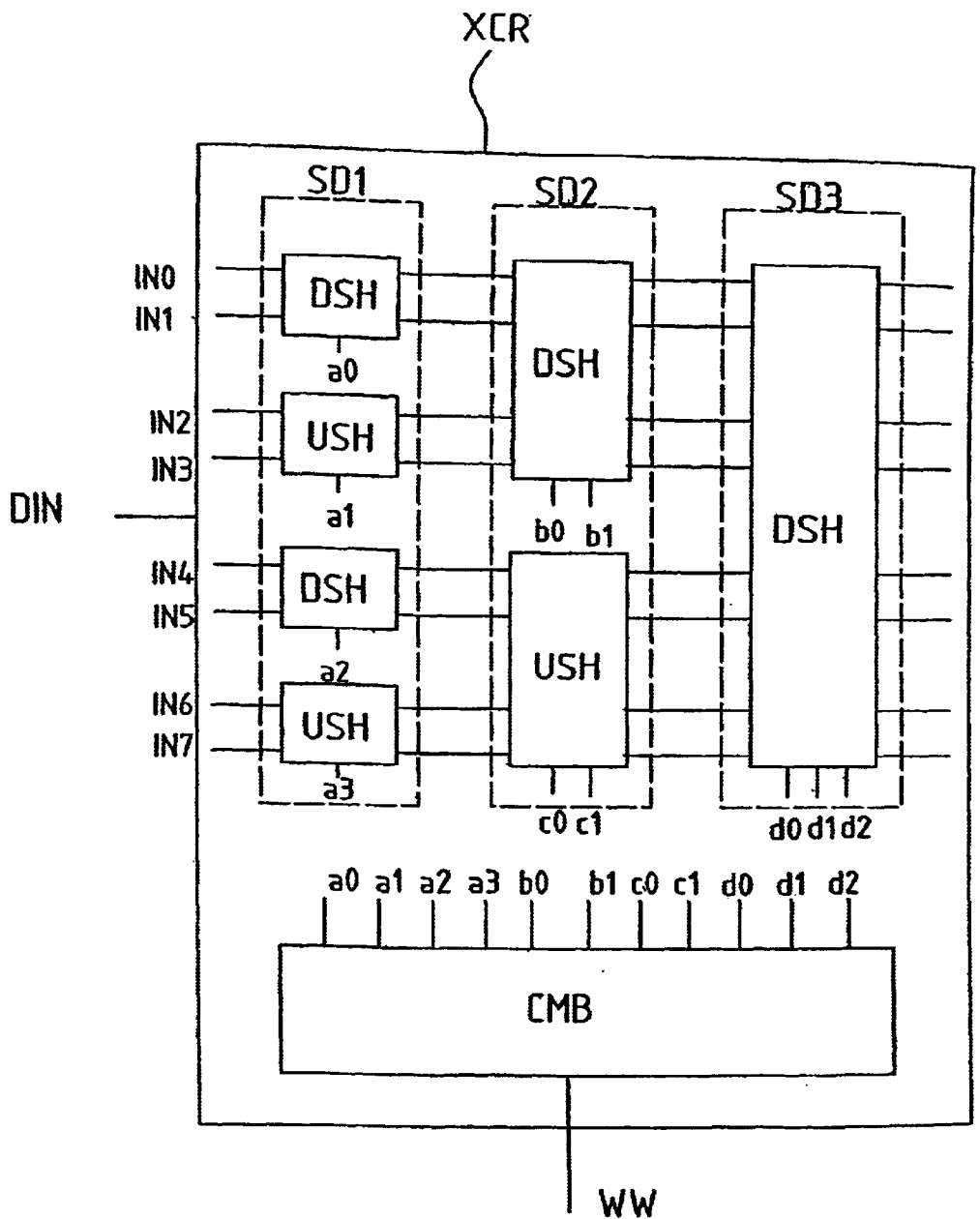
FIG. 5 shows a second detail of a space-time switch matrix according to the present invention.

FIG. 5 shows a detailed diagram of the packer block XCR. The packer block XCR represented in the figure has 8 inputs IN0...IN7, and it is obtained through a recursive three-stage structure, i.e. a number of stages corresponding to the base two logarithm of the number of inputs IN0..IN7. Said stages from SD1 to SD3 are obtained through different size up shifters USH and down shifters DSH. If q is the number of shifters inputs of the i-th stage, then every string of q bits at the shifter input is displaced either up or down by a number of locations ranging from 0 to q−1. The shifting amount is such that the bits to be stored in the following memory DRM will be aligned either starting from the lower output of each down shifter DSH or starting from the upper output of each up-shifter USH.

Shifters are obtained using multiplexers from two to one, in number of q*log 2(q), so the total number of multiplexers to be used is:

$$\frac{N}{2}\log_2(N) * (1 + \log_2(N))$$

The shifters of the first stage SD1 are driven by control signals a0, a1, a2, a3, whereas the up-shifter of the second stage SD2 is driven by control signals b0, b1 and the down-shifter of the second stage by control signals c0, c1. The down-shifter DSH3 of the third stage is driven by signals d0, d1, d2. Said control signals are generated by a combinatorial network CMB, which is driven by a write sequence WW outputted from the write control memory WCM.

Driving operation is as follows:

a) a0 is zero if IN1 carries an active bit, otherwise it is one. a1 is zero if IN2 carries an active bit, otherwise it is one. The same applies for a2 and a3.

b) b1b0, i.e. the binary number they represent, is equal to the number of active bits carried by signals IN2 and IN3; c1c0 is equal to the number of bits carried by signals IN4 and IN5;

c) d2d1d0 is equal to the number of bits carried by signals a IN4, IN5, IN6, IN7.

Therefore the combinatorial network CMB generating control signals must be a combinatorial network counting the number of zeros in subsets of the words contained in the write control memories WCM.

In order to correctly fill the buffer BUF, an integration is required at step c) where the number of bits already stored in the buffer BUF is subtracted to the number represented by d2d1d0.

Figure 6:
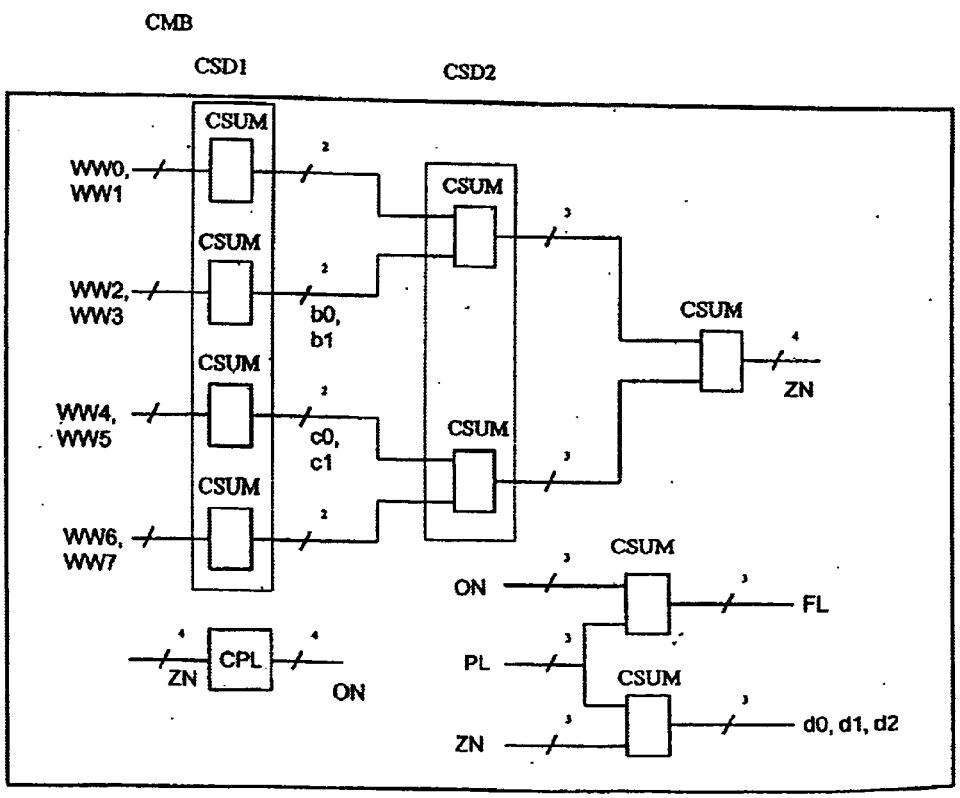
FIG. 6 shows a further detail of the detail of FIG. 5.

FIG. 6 shows the diagram of the combinatorial network CMB where the same recurring structure used for the packer block XCR is used, so that the write sequence WW outputted from the write control memory WCM is sent to a first stage CSD1 composed by N/2, i.e. 4 adders CSUM. Said write sequence WW contains substantially the information about the active bits at inputs IN0..IN7 of the stage SD1 of the packer block XCR. Adders CSUM will sum up bits WW0...WW7 by pair composing the write sequence WW complemented to 1, thus outputting control signals b1b0 from the sum of bits WW2 and WW3, and c1c0 from the sum of bits WW4 and WW5, according to the above rule b). In fact, if e.g. bits WW2 and WW3 of the write sequence WW complemented to 1 carry an active bit, they will be 1 and 0 or 0 and 1. CSUM will output 01, which is equal to the control signal b1b0, used according to the above described rule b).

Control signals a0, a1, a2, a3 derive directly from bits WW1...WW8 of the write sequence WW complemented to 1, with the following equalities:

| a0 = WW1 | a1 = WW2 | a2 = WW5 | a3 = WW6. |
|---|---|---|---|

Output signals from the first stage CSD1 enter a second stage CSD2, composed of two further adders CSUM, whose outputs have 3-bit signals and then a third stage CSD3, composed of a single adder CSUM, whose output has a zero number signal ZN, which is a four-bit signal representing the number of zeros contained in the write sequence WW. Said zero number signal ZN, properly complemented to 2 in a complementator block CPL, provides a one number signal ON, which represents the one number contained in the write sequence WW, i.e. the total number of active bits. The zero number signal ZN, the one number signal ON and a written bytes number signal PL representing the number of bytes already written in the buffer BUF, are sent to two adders CSUM, from which the control signal d2d1d0 is obtained summing ZN and PL, whereas when summing ON and PL a modified bytes number signal FL is obtained, which represents the bytes stored in the buffer BUF after writing the incoming ON bytes.

Figure 1:
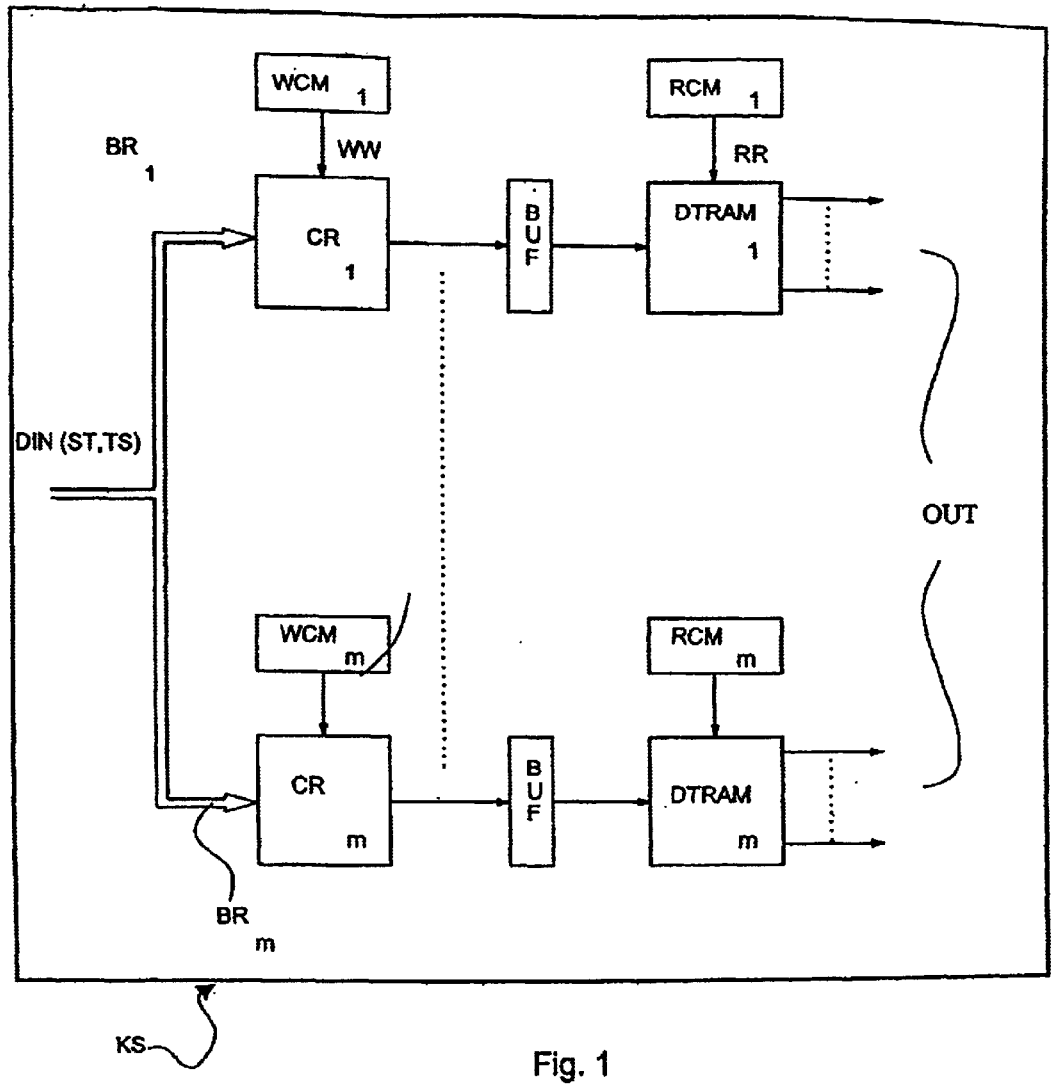
FIG. 1 shows a basic diagram of a switch matrix according to the known state of the art.
Figure 2:
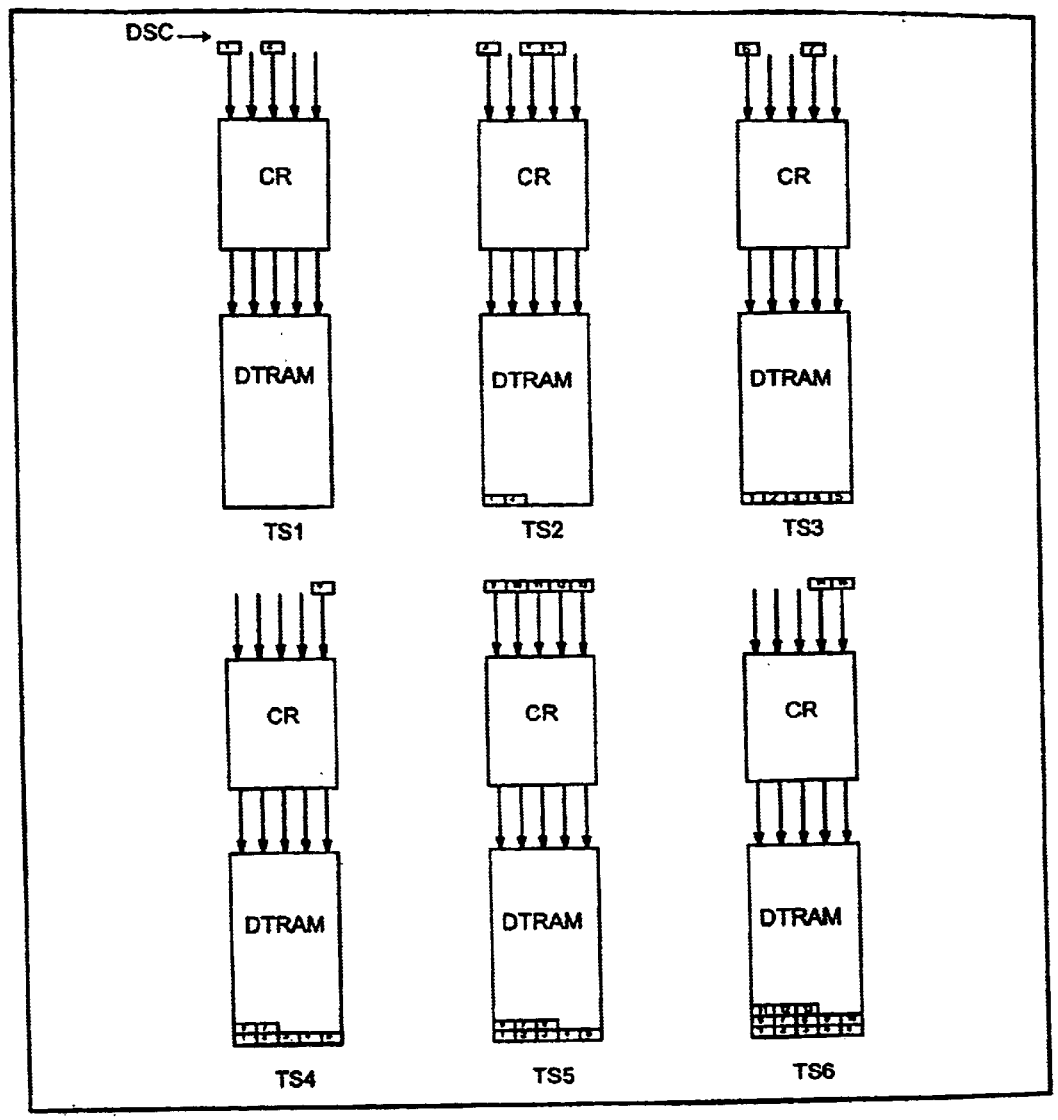
FIG. 2 shows a basic diagram of the operation of an element of the switch matrix shown in FIG. 1.
Figure 3:
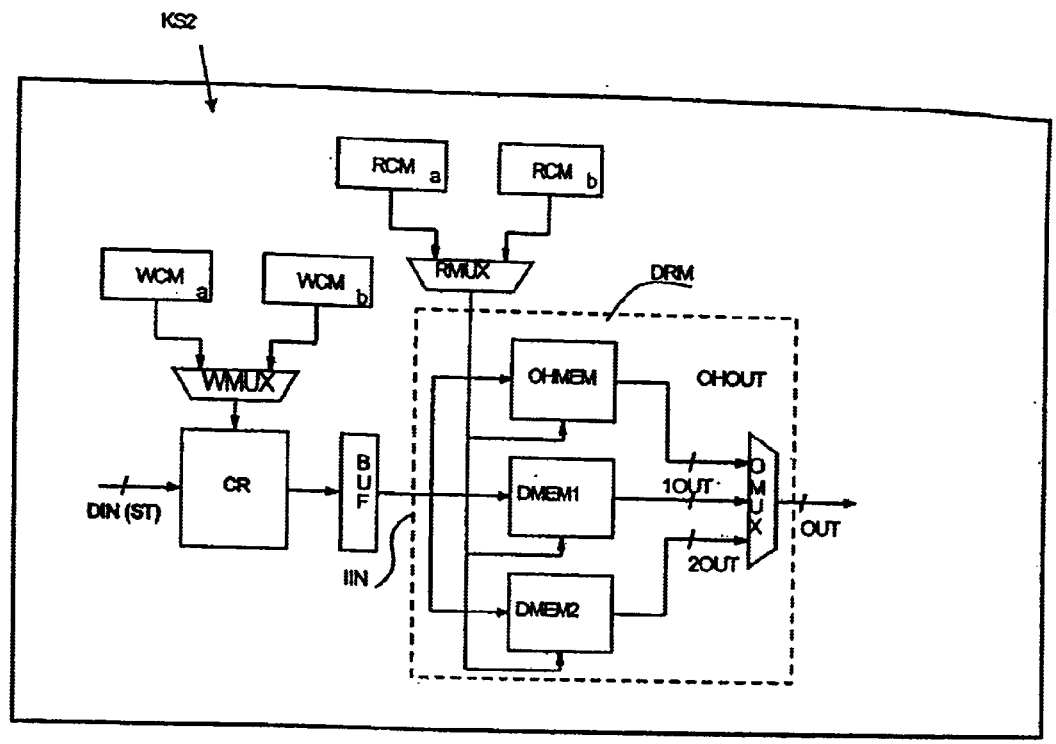
FIG. 3 shows a basic diagram of circuit details of the switch matrix among the tributaries of a telecommunication network of FIG. 1.
Figure 7:
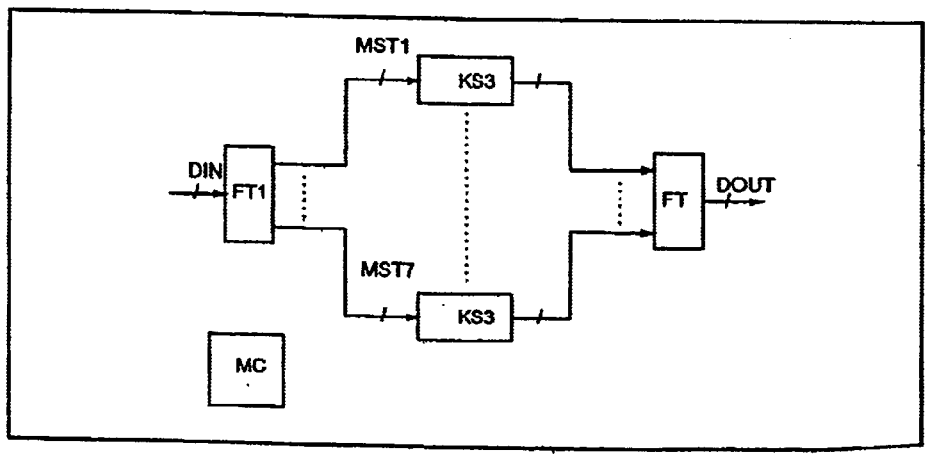
FIG. 7 shows a set of space-time switch matrixes arranged according to a method according to the present invention.
Figure 3B:
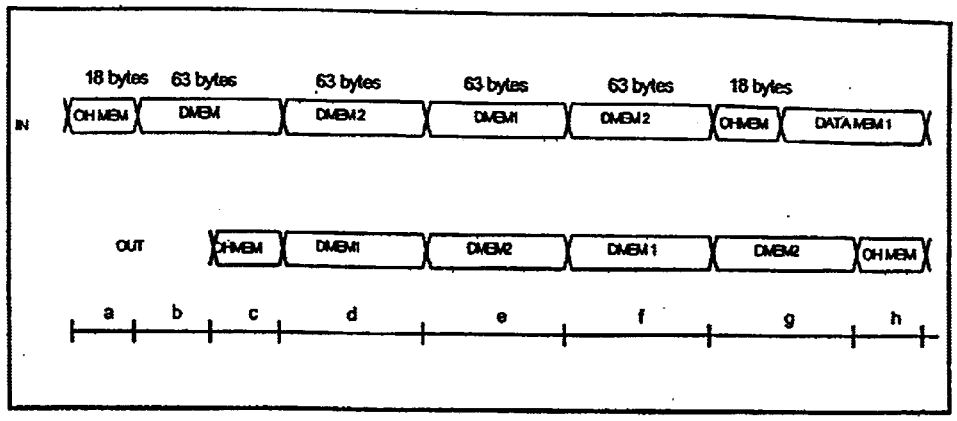
FIG. 3b shows a time diagram related to the circuit details of the switch matrix among the tributaries of a telecommunication network shown in FIG. 3.

FIG. 7 also shows a switch matrixes system KS3, that can be optionally used. It contains a data flow input DIN, consisting of N frames ST, e.g. 38.88 MHz STM-1 frames, reaching a first multiplexing block FT1, wherefrom modified frames MST come out and reach switch matrixes KS3 in parallel. Outputs from switch matrixes KS3 are then sent to the input of a second switch block FT, which composes an output data flow DOUT.

Assuming, now, that the data flow DIN consists of N byte-arranged frames ST, where N=8*h with h being an integer, it is possible, starting from said N frames ST, to form 8 of such sets SSET of h modified frames MST, wherein each modified frame MST pertaining to the i-th set SSET will only contain the i-th bits of each byte for each input frame ST. For instance, the l-th modified frame MST of the i-th set SSET is only composed of the i-th or i position bits contained in input frames ST 1*8, 1*8+1,..., 1*8+7. The bit rate of modified frames MST remains obviously unchanged.

Therefore, through the first multiplexing block FT1, the information which is "bitwise" or byte carried in frames ST, such as the standard frames STM-1, will be converted into a "bitwise" or bit carried information in modified frames MTS. Bits in modified frames MTS have the advantage of being fully independent to each other as far as connections are concerned.

This conversion allows to employ 8 similar modules as switch matrixes KS3, each one able to elaborate a set SSET of modified frames MST. This allows the use of 8 smaller memories of the same size, one memory for the 8 switch matrixes KS3. Thus, memories having a bigger size can be obtained by combining predetermined smaller matrixes. Similarly, also the number of addresses to be managed falls down to an eighth, just like the number of memory ports. The latter factor is rather significant, as the number of connection pins or terminals on one same memory block is finite, so a lower number of ports means to reserve a higher number of pins for other uses.

In view of the above description the features of the present invention will be clear, as well as its advantages are rather obvious.

The switch matrix among the tributaries of a telecommunication network according to the present invention requires a smaller number of circuits, thus resulting in a smaller space use for the circuits and lower manufacturing costs.

In fact, the switch matrix among the tributaries of a telecommunication network according to the present invention, uses advantageously a smaller number of control memories for read and write operations. Said read and write control memories can be updated without duplicating the RAM memory and incurring read errors of the RAM memory itself.

The switch matrix among the tributaries of a telecommunication network according to the present invention also uses a packing circuit whose structure is more slender compared to the solutions already known, in particular with respect to the double concentration and rotating block. The used recursive structure allows for a saving of circuits and of space on the circuit, specifically in conjunction with the bitwise frames recomposition on which it operates. Said bitwise recomposition distributes incoming data flows and will also and above all reduce the complexity of the managing logic circuits of RAM memory addressing.

Variations and modifications of the present invention should be apparent to those of skill in the art without departing from the scope of the present invention as defined by the attached claims.

We claim:

1. A switch matrix among the tributaries of a telecommunication network, specifically a telecommunication network operating on flows of data that are arranged according to SDH protocol, said switch matrix comprising:
   a set of parallel branches, each of said branches comprising:
      at least a first space stage that is able to select and pack, from the input data flow, a subset of data to be exchanged, wherein the first space stage comprises means for selecting and packing the subset of data to be exchanged, and wherein said means for selecting and packing make use of a recursive structure of shifter circuit, wherein said recursive structure of shifter circuits is driven by combinatorial logic means which elaborate a write sequence on the subset of data to be exchanged provided by the write memory, said logic means comprising a recursive structure of adders; and
      a second time stage that is able to store the data subset to be exchanged,
   and a random access memory device associated with a write memory and a read memory, said write memory and read memory being driven by a microprocessor and a master counter,
   wherein the read memory and write memory related to each random access memory device are updated together with a spare read memory that is common to read memories on all branches in parallel and with a spare write memory that is common to write memories on all branches in parallel, respectively.

2. A switch matrix according to claim 1 wherein each write memory is associated with a write multiplexer which selects its output alternatively to the output of the spare write memory, under control of the microprocessor, and connects them with the random access memory.

3. A switch matrix according to claim 2 wherein each read memory is associated with a read multiplexer which selects its output alternatively to the output of the spare read memory, under control of the microprocessor, and connects them with the random access memory.

4. A switch matrix according to claim 3 wherein the random access memory comprises a first memory block and a second memory block, the second memory block being a duplicate of the first memory block.

5. A switch matrix according to claim 2 wherein each read memory is associated with a controlled read multiplexer which selects its output alternatively to the output of a spare read memory, said controlled read multiplexer being driven by the address available at the output of the read memory and connecting it with the random access memory.

6. A switch matrix according to claim 5 wherein the random access memory comprises a single memory block for the subset of data to be exchanged.

7. A switch matrix according to claim 1 wherein said recursive structure of shifter circuits comprises of a set of stages arranged in series, each stage comprising down shifter circuits or up shifter circuits arranged in parallel and alternating with up shifter circuits or respective down shifter circuits.

8. A switch matrix according to claim 7 wherein the recursive structure of adders elaborates the write sequence to supply driving signals to said down shifter circuits and to said up shifter circuits.

9. A switch matrix according to claim 1 wherein the sets of data to be exchanged are provided by permutation means upstream of said switch matrix, said permutation means carrying out a "bitwise" permutation of the input data flow in modified frames sets.

10. A method of managing a switch matrix of tributaries of a telecommunication network, specifically a telecommunication network operating on flows of data that are arranged according to SDH protocol, which is divided in a set of parallel branches, each of said branches comprising:
   at least a first space stage carrying out on the input data flow a selection and packing of a subset of data to be exchanged,
   a second time stage storing the subset of data to be exchanged, the write and read operations in a random access memory device of said second time stage being controlled by a write memory and a read memory through write and read words, with said memories being in turn driven by a microprocessor and a master counter, in said second time stage, during updating of the random access memory, said read and write operations being performed simultaneously using spare read memories and spare write memories, wherein the method comprises:
      associating a single spare read memory to read memories on each parallel branch and a single spare write memory to write memories on each parallel branch;
      selecting, via selecting means, either the output of the spare read memory or the output of the read memory, as well as the output of the spare write memory and the write memory;
      writing a write sequence in the spare write memory during the updating of the random access memory;
      checking, during the writing of the read word in the write memory whether the read word written in the read memory, which represents the address to be read in the random access memory, is greater or smaller than the address whereto said read word is written in the read memory itself;
      driving said selecting means to select the spare read memory if the address is greater, or to select the read memory if the address is smaller; and
      selecting the read memory definitively at the end of write operation of the read word in said read memory and employ the spare write memory in association with a write memory belonging to another branch.

11. A method of managing a switch matrix of tributaries of a telecommunication network, specifically a telecommunication network operating on flows of data that are arranged according to SDH protocol, which is divided in a set of parallel branches, each of said branches comprising:
   at least a first space stage carrying out on the input data flow a selection and packing of a subset of data to be exchanged,
   a second time stage storing the subset of data to be exchanged, the write and read operations in a random access memory device of said second time stage being controlled by a write memory and a read memory through write and read words, with said memories being in turn driven by a microprocessor and a master counter, in said second time stage, during updating of the random access memory, said read and write operations being performed simultaneously using spare read memories and spare write memories, wherein the method comprises:

associating a single spare read memory to read memories on each parallel branch and a single spare write memory to write memories on each parallel branch;

selecting, by selecting means, either the output of the spare read memory or the output of the read memory, as well as the output of the spare write memory and the write memory;

writing a write sequence in the spare write memory during the updating of the random access memory;

selecting the output of the spare write memory supplying the write sequence to both the selecting and packing means and the write memory;

selecting the output of the write memory, after it has been written with the write sequence, and employ the spare write memory in association with a write memory belonging to another branch;

providing the first space stage with the write sequence;

employing said write sequence to obtain control signals to drive a recursive structure of shifter circuits; and employing said recursive structure of shifter circuits to pack the set of data to be exchanged, wherein the recursive structure of shifter circuits is obtained through a plurality of stages, and in that each shifter circuit, equipped with q inputs, carries out an up shift or down shift on q bits available at its q inputs by a number of locations ranging from 0 to q−1.

12. A method according to claim 11 wherein the input data flow is rearranged by a "bitwise" permutation in sets of modified frames before entering the switch matrix.

13. A method according to claim 12 wherein said "bitwise" permutation is performed picking up each i-th bit, or bit at location i, in a frame among all the frames forming the input data flow to obtain sets of modified frames, each i-th set being formed only by the i-th bits of frames.

14. A method of managing a switch matrix of tributaries of a telecommunication network, specifically a telecommunication network operating on flows of data that are arranged according to SDH protocol, which is divided in a set of parallel branches, each of said branches comprising:

at least a first space stage carrying out on the input data flow a selection and packing of a subset of data to be exchanged, a second time stage storing the subset of data to be exchanged, the write and read operations in a random access memory device of said second time stage being controlled by a write memory and a read memory through write and read words, with said memories being in turn driven by a microprocessor and a master counter, in said second time stage, during updating of the random access memory, said read and write operations being performed simultaneously using spare read memories and spare write memories, wherein the method comprises:

associating a single spare read memory to read memories on each parallel branch and a single spare write memory to write memories on each parallel branch;

selecting, by selecting means, either the output of the spare read memory or the output of the read memory, as well as the output of the spare write memory and the write memory;

writing a write sequence in the spare write memory during the updating of the random access memory;

selecting the output of the spare write memory supplying the write sequence to both the selecting and packing means and the write memory;

selecting the output of the write memory, after it has been written with the write sequence, and employ the spare write memory in association with a write memory belonging to another branch;

providing the first space stage with the write sequence;

employing said write sequence to obtain control signals to drive a recursive structure of shifter circuits; and employing said recursive structure of shifter circuits to pack the set of data to be exchanged, wherein the selecting of the output of the spare read memory or the output of the read memory, as well as the output of the spare write memory and the write memory, is carried out by a recursive structure of adders which execute subsequent sums on the bits forming the write sequence, supplying control signals as intermediate or final results.

15. A method according to claim 14 wherein the input data flow is rearranged by a "bitwise" permutation in sets of modified frames before entering the switch matrix.

16. A method according to claim 15 wherein said "bitwise" permutation is performed picking up each i-th bit, or bit at location i, in a frame among all the frames forming the input data flow to obtain sets of modified frames, each i-th set being formed only by the i-th bits of frames.

17. A switch matrix among the tributaries of a telecommunication network, specifically a telecommunication network operating on flows of data arranged according to SDH protocol, said switch matrix comprising:

a set of parallel branches, each of said branches comprising at least a first space stage which is able to select and pack, from the input data flow, a subset of data to be exchanged, and a second time stage which is able to store the data subset to be exchanged; and a random access memory device associated with a write memory and a read memory, said write memory and read memory being driven by a microprocessor and a master counter, wherein the first space stage comprises means for selecting and packing the subset of data to be exchanged, and in that said selecting and packing means make use of a recursive structure of shifter circuit, wherein said recursive structure of shifter circuits is driven by combinatorial logic means which elaborate a write sequence on the subset of data to be exchanged provided by the write memory, said logic means comprising a recursive structure of adders.

18. A method of managing a switch matrix of tributaries of a telecommunication network, specifically a telecommunication network operating on flows of data that are arranged according to SDH protocol, which is divided in a set of parallel branches, each of said branches comprising:

at least a first space stage carrying out on the input data flow a selection and packing of a subset of data to be exchanged, a second time stage storing the subset of data to be exchanged, the write and read operations in a random access memory device of said second time stage being controlled by a write memory and a read memory through write and read words, said memories being driven by a microprocessor and a master counter, in said second time stage, during updating of the random access memory, said read and write operations being performed simultaneously using spare read memories and spare write memories, wherein said read and write operations comprise rearranging the input data flow by a "bitwise" permutation in sets of modified frames before entering said switch matrix, wherein said "bitwise" permutation is performed picking up each i-th bit, or bit at location i, in a frame among all the frames forming the input data flow to obtain sets of modified frames, each i-th set being formed only by the i-th bits of frames.

* * * * *